United States Patent
Frank

(10) Patent No.: US 12,289,153 B2
(45) Date of Patent: Apr. 29, 2025

(54) COMMUNICATION APPARATUS AND METHOD FOR COMMUNICATING USING A TRANSMIT POWER DIFFERENCE BETWEEN ANTENNAS

(71) Applicant: Lenovo (Singapore) Pte. Ltd., New Tech Park (SG)

(72) Inventor: Colin Frank, Park Ridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 18/585,662

(22) Filed: Feb. 23, 2024

(65) Prior Publication Data

US 2024/0195477 A1 Jun. 13, 2024

Related U.S. Application Data

(63) Continuation of application No. 17/910,793, filed as application No. PCT/IB2021/052343 on Mar. 20, 2021, now Pat. No. 11,936,458.

(60) Provisional application No. 62/992,864, filed on Mar. 20, 2020.

(51) Int. Cl.
 *H04B 7/06* (2006.01)
(52) U.S. Cl.
 CPC .................... *H04B 7/063* (2013.01)
(58) Field of Classification Search
 CPC .............................. H04B 7/063; H04B 7/0465
 See application file for complete search history.

(56) References Cited

U.S. PATENT DOCUMENTS

| | | | | |
|---|---|---|---|---|
| 9,287,953 B2 * | 3/2016 | Ngai | ............ | H04B 7/0602 |
| 11,936,458 B2 | 3/2024 | Frank | | |
| 2009/0054093 A1 * | 2/2009 | Kim | ............ | H04B 7/061 |
| | | | | 455/500 |
| 2013/0272257 A1 * | 10/2013 | Takaoka | ............ | H04W 52/42 |
| | | | | 370/329 |
| 2023/0109687 A1 | 4/2023 | Frank | | |

FOREIGN PATENT DOCUMENTS

| CN | 115298968 A | 11/2022 |
|---|---|---|
| EP | 4122114 A1 | 1/2023 |
| WO | 2021186417 A1 | 9/2021 |

OTHER PUBLICATIONS

Frank, Colin, "Pursuant to MPEP § 2001.06(b) the applicant brings the following co-pending application to the Examiner's attention:", U.S. Appl. No. 62/992,864, filed Mar. 20, 2020, 17 pages.

* cited by examiner

*Primary Examiner* — Kabir A Timory
(74) *Attorney, Agent, or Firm* — FIG. 1 Patents

(57) ABSTRACT

Reference symbols can be received. A first received power of the reference symbols on a first antenna port can be measured. A second received power of the reference symbols on a second antenna port that is coupled to and uses the same transmit power amplifier as the first antenna port can be measured. A received power difference can be determined based on a relationship between the second received power and the first received power. A value of the received power difference can be transmitted.

19 Claims, 4 Drawing Sheets

COMMUNICATION APPARATUS AND METHOD FOR COMMUNICATING USING A TRANSMIT POWER DIFFERENCE BETWEEN ANTENNAS

BACKGROUND

1. Field

The present disclosure is directed to a method and apparatus for communicating using a transmit power difference between antennas.

2. Introduction

Presently, wireless communication devices, such as User Equipment (UE), communicate with other communication devices using wireless signals. For Time Division Duplex (TDD) bands, the channel estimation for the downlink channel, such as from a base station, such as a gNB, to a UE, can be estimated based on Sounding Reference Signals (SRS) transmitted from the UE. Without SRS, the UE should measure the channel, select the best gNB precoder from a pre-defined codebook, and signal the best precoder to the gNB. The advantage of SRS based channel estimation is that the UE does not need to signal the precoder to the gNB, and the gNB precoder is not limited to a pre-defined codebook. Unfortunately, there are issues with channel estimation based on SRS transmission.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments can provide a method and apparatus for communicating on a wireless network. Embodiments can also provide a method and apparatus for communicating using a transmit power difference between antennas. Embodiments can further provide a communication apparatus and methods for compensating unequal SRS transmit power for reciprocity-based channel estimation.

According to a possible embodiment, a transceiver can include a power amplifier. A first antenna port can be coupled to the power amplifier to receive power from the power amplifier. A second antenna port can be coupled to the power amplifier to receive power from the power amplifier. A controller can determine transmit power difference information corresponding to a transmit power difference between transmit power on the first antenna port and transmit power on the second antenna port. The transceiver can transmit the transmit power difference information.

Figure 1:
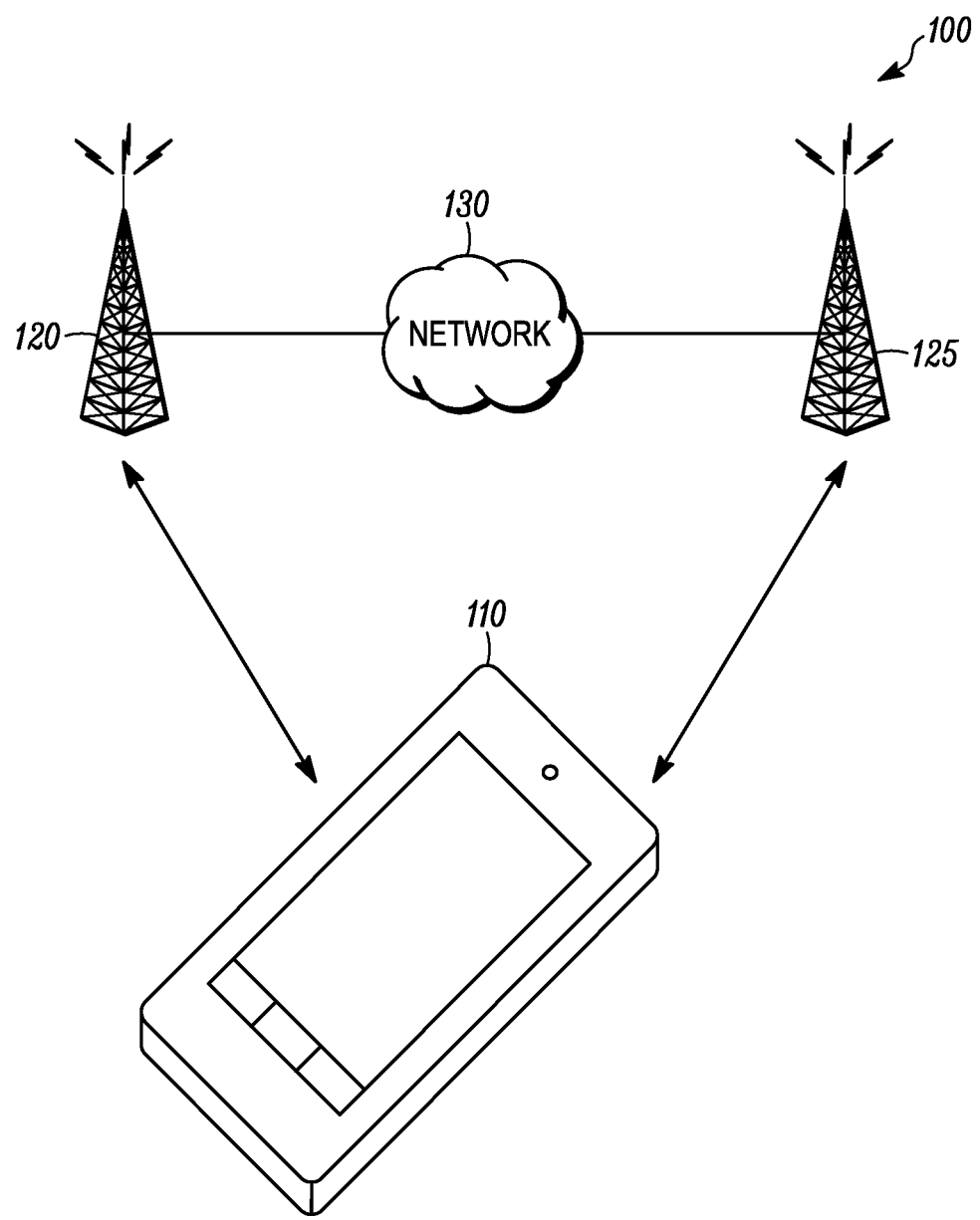
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an IoT device, or any other user device that is capable of sending and receiving communication signals on a wireless network. The at least one network entity 120 and 125 can be a wireless wide area network base station, can be a NodeB, can be an eNB, can be a gNB, such as a 5G NodeB, can be an unlicensed network base station, can be an access point, can be a base station controller, can be a network controller, can be a TRP, can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a TDMA-based network, a CDMA-based network, an OFDMA-based network, an LTE network, a NR network, a 3GPP-based network, a 5G network, a satellite communications network, a high-altitude platform network, the Internet, and/or other communications networks.

In operation, the UE 110 can communicate with the network 130 via at least one network entity 120. For example, the UE 110 can send and receive control signals on a control channel and user data signals on a data channel.

There are some issues with channel estimation based on SRS transmission. The channel observed by the gNB is the concatenation of the UE transmit Radio Frequency (RF) circuitry, the propagation channel, and the gNB receive RF, where the RF circuitry filters and amplifies the signal and lies between the digital-to-analog converter and the antenna of the UE and between the antenna and the analog-to-digital converter of the gNB. Similarly, the channel observed by the UE is the concatenation of the gNB transmit RF circuitry, the propagation channel, the UE receive RF circuitry, where the RF circuitry filters and amplifies the signal and lies between the digital-to-analog converter and the antenna of the gNB and between the antenna and the analog-to-digital converter of the UE. If the gNB has M antennas and the UE has N antennas, then the propagation channel can be represented as an M×N matrix. The gNB transmit and receive RF can both be represented as M×M matrices and the UE transmit and receive RF can both be represented as N×N matrices. In this disclosure, it is assumed that the gNB is calibrated such that the gNB transmit and receive RF matrices are equal, at least within a complex scaling factor.

It is generally true that below 6 GHZ, the UE RF is not calibrated so that UE transmit and receive RF matrices are not equal. At the very least, the 3GPP specifications (e.g., TS 38.101-1) do not require that the UE RF is calibrated so that the UE transmit and receive RF are equal.

Let H denote the M×N channel propagation matrix, where H includes the effect of the gNB and UE antenna patterns as well as the orientation of the gNB and UE with respect to each other and environmental factors such as the placement of the hand and head relative to the device. The Singular Value Decomposition (SVD) for the channel matrix is given by $$H = USV^*$$

where U is an M×M matrix whose columns are the left singular vectors of H, S is a diagonal M×N matrix with diagonal values equal to the singular values of H, V is an N×N matrix with columns equal to the right singular vectors, and * denotes the Hermitian of a matrix. In order to achieve channel capacity, the gNB should know the left singular values of H and the corresponding singular values. The gNB does not require knowledge of the right singular vectors in order to achieve channel capacity.

For the UE, let T denote the N×N RF transmit channel and the R denote the N×N RF receive channel. As noted above, there is no requirement in the RAN4 specifications that T=R. In the absence of mutual coupling, both T and R are diagonal matrices. Now, consider a first case in which the amplitudes of the diagonal elements of T and R are unity, but the phases can be different so that $$T = R \begin{bmatrix} e^{j\theta_1} & 0 & 0 \\ 0 & e^{j\theta_2} & 0 \\ 0 & 0 & e^{j\theta_3} \end{bmatrix}.$$

In this case, the channel propagation matrix observed by the UE is given by $$HR$$

while the matrix observed by the gNB is $$HT = HR \begin{bmatrix} e^{j\theta_1} & 0 & 0 \\ 0 & e^{j\theta_2} & 0 \\ 0 & 0 & e^{j\theta_3} \end{bmatrix}.$$

Because the gNB observes the channel H T, it will compute the SVD of H T and use the left singular vectors and corresponding singular values to choose the precoders and to allocate power to these precoders. In order for the precoding and power allocation to be correct for the UE, it should be that left singular vectors and corresponding singular values are the same for H T as for H R. Equivalently, it should be true that the left singular vectors and singular values should be the same for $$HR \begin{bmatrix} e^{j\theta_1} & 0 & 0 \\ 0 & e^{j\theta_2} & 0 \\ 0 & 0 & e^{j\theta_3} \end{bmatrix}$$

as for H R. In fact, it can be shown that the left singular vectors and singular values are the same for both matrices, and as a result, the base station can implement optimal precoding and power allocation on the downlink even though H T≠H R.

We next consider the amplitudes on the UE transmit are different than the amplitudes on the UE receive. More specifically, we consider the case in which the amplitude differences between the different antennas are unequal so that the difference cannot be modeled as a single complex gain difference common to all antennas. In this case, we have $$T = R \begin{bmatrix} \alpha_1 & 0 & 0 \\ 0 & \alpha_2 & 0 \\ 0 & 0 & \alpha_3 \end{bmatrix}$$

where in general $|\alpha_1| \neq |\alpha_2| \neq |\alpha_3|$. In order for these unequal gains to have no impact on channel capacity, it should be that the left singular vectors and the singular values of H T are equal to the left singular vectors and singular values of H R, or equivalently, it should true that the left singular values and singular vectors of H R and $$HT = HR \begin{bmatrix} \alpha_1 & 0 & 0 \\ 0 & \alpha_2 & 0 \\ 0 & 0 & \alpha_3 \end{bmatrix}$$

However, it can easily be shown (by example) that the left singular vectors and singular values of H T are not equal to those of H R, and as a result it will not be possible for the gNB to select precoders and a power allocation among these precoders that is consistent with achieving channel capacity.

Now, from the RAN4 specification TS 38.101-1, it is clear that the it is not required that the UE transmit gains are equal (within a multiplicative constant) to the UE receive gains. In particular, in the case that some antenna ports are receive-only with the exception of SRS transmission, the TS 38.101 specification specifically defines transmit power relaxations which are only applicable to the transmission of SRS symbols over these receive-only antenna ports, and these relaxations can be as large as 4.5 dB. The reason for these relaxations is that the receive-only antenna ports do not have their own dedicated Power Amplifier (PA). Instead, the PA used for SRS transmission is borrowed from antenna port that is intended for both transmission and reception of data. As a result, there is additional switch loss and trace loss between the PA and the receive-only port. The allowed relaxations are captured in the following text from TS 38.101-1.

$\Delta T_{RxSRS}$ is applied when UE transmits SRS to other than first SRS port when the SRS-TxSwitch capability is indicated as '1T2R', '1T4R' or, '1T4R/2T4R' with UE configured with 4 SRS resources in the SRS resource set, and when UE transmits SRS to other than first or second SRS port when the SRS-TxSwitch capability is indicated as '2T4R' or '1T4R/2T4R' with the UE configured with 2 SRS resources in the SRS resource set. The value of $\Delta T_{RxSRS}$ is 4.5 dB for n79 and 3 dB for bands whose $F_{UL\_high}$ is lower than the $F_{UL\_low}$ of n79. For other SRS transmissions $\Delta T_{RxSRS}$ is zero;

The terms '1T2R', '1T4R', '2T4R' and, '1T4R/2T4R' can refer to different TxSwitch capabilities. For 1T2R, the UE has one transmit and two receive antennas. For 1T4R, the UE has one transmit and four receive antennas. For 2T/4R, the UE has two transmit and four receive antennas. For 1T4R/2T4R, the UE has four receive antennas and can operate with one or two transmit antennas.

As can be seen, the allowed relaxation is 3 dB for bands less than 4.5 GHZ, and is 4.5 dB for bands above 4.5 GHZ.

Now it is not in general possible for the gNB to learn the SRS power relaxation for the RX only port (and compensate) because the difference in received power from the UE antennas can be due to different sources. For example, the antenna patterns will be different for the transmit/receive antenna and the receive-only antenna. Furthermore, the gains seen will vary in accordance with the orientation of the UE in relation to the gNB. As another example, the head/hand blockage will be different for the two transmit/receive antenna and the receive-only antenna due to the locations of the antennas on the device, and this difference will also depend on the use case (voice vs. video vs. gaming). As another example, the output power for the receive-only antenna can be significantly less than for the transmit/receive antenna.

The differences in received power in the first and second examples are reciprocal on the uplink and downlink, and so need not be estimated or compensated. Conversely, the power difference in the third example is non-reciprocal and so should be estimated and corrected in the channel estimate in order to optimize downlink capacity.

While there are no known existing solutions, one alternative can be to assume no transmit power relaxation for the receive-only antenna. Another option can be to assume the maximum allowed transmit power relaxation for the receive-only antenna. Other disclosed embodiments can provide additional solutions to the problem.

For example, there can be additional methods that the gNB can determine the difference in transmit power between the transmit/receive antenna and the receive-only antenna, where certain elements may be common and/or interchangeable between the methods. In a first method, the UE should be calibrated so that it can report the actual power relaxation on the receive antenna. Given this information, the gNB can correct its channel estimate. With this corrected channel estimate, the gNB can correctly determine the optimal precoding vectors from the left singular vectors, and can correctly determine the optimal power allocation from the singular vectors.

A second method can also be used for the gNB to determine the difference in transmit power. In a first step, using SRS transmitted by the UE, the gNB determines the difference in the received power from the transmit/receive port and from the receive-only port. For a given gNB antenna port, the gNB initially measures the received power from the UE transmit/receive port and then measures the received power from the UE receive-only port. The gNB then computes the difference between these two measured powers. The difference in the received power reflects the differences in the UE antenna gains, the hand/head blocking, and transmit power relaxation.

In a second step, the UE measures the power received from the same gNB transmit port in the first step on both the transmit/receive port and the receive-only port. The UE then computes the difference in the received power. The difference reflects the difference between the UE antenna gains and head/hand blocking, but does not include the UE transmit power relaxation between the two UE ports. The UE measurements can be taken on any set of reference symbols that are transmitted from the port used for the UE measurements in the first step.

In a third step, the measurement of the received power difference between the two UE ports is reported to the gNB.

In a fourth step, the gNB determines the difference between the received power difference it measured for the two UE ports with the received power difference between the two UE ports that the UE measured and reported. This difference reflects the transmit power relaxation taken by the UE on the receive-only port and which should be used to correct the gNB channel estimate. The gNB should know which port is the transmit/receive port and which port is the receive-only port.

The first through fourth steps can be repeated for multiple gNB ports. The estimates computed for each of the gNB ports should be the same and can be averaged.

Embodiments can provide for measuring the transmit power relaxation taken on the receive-only (except for SRS transmission) antenna by comparing the difference in the uplink path loss between the UE transmit/receive antenna and the receive-only antenna at a single gNB antenna and comparing the path loss difference with the path loss difference measured at the UE between the signal received from the same gNB antenna at the transmit/receive antenna and at the receive-only antenna. This difference is equal to the transmit power relaxation on the receive-only UE antenna. The difference in path loss measured at the UE from the gNB antenna to the transmit/receive antenna and the receive-only antenna is signaled to the gNB so that the gNB can compute the transmit power relaxation on the receive only antenna and use this to correct its SRS-based channel estimate.

A simulator can determine the capacity loss that results if the gNB uses the measured channel, without correction of the SRS power relaxation on the receive-only port, to select the optimal precoders and power allocation. The simulator will first determine the channel capacity as a function of SNR for the true channel. The simulator will then determine the measured channel as a function of the power relaxation on the receive-only antenna. The simulator will then calculate the precoders and power allocation for the measured channel and then apply these to the actual channel. The capacity will be computed under the assumption that the UE uses an MMSE receiver and that the optimal coding rate is used (even though the optimal code rate is not known to the gNB).

Figure 2:
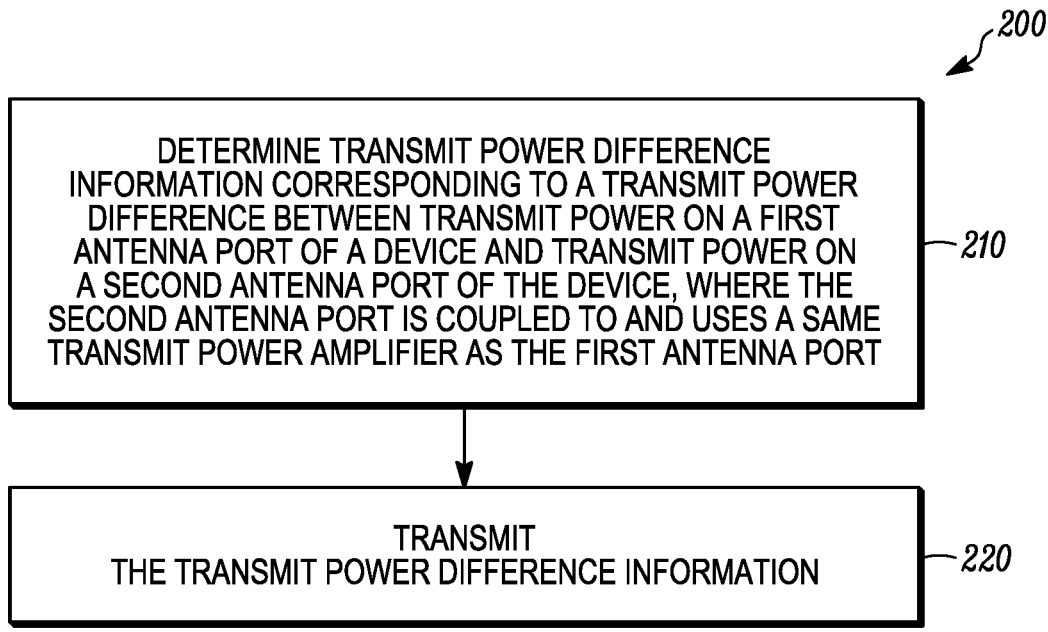
FIG. 2 is an example flowchart illustrating the operation of an apparatus according to a possible embodiment.

FIG. 2 is an example flowchart 200 illustrating the operation of a wireless communication device, such as the UE 110, according to a possible embodiment. At 210, transmit power difference information can be determined. The transmit power difference information can correspond to a transmit power difference between transmit power on a first antenna port of the device and transmit power on a second antenna port of the device. The second antenna port can be coupled to and use a same transmit power amplifier as the first antenna port.

An antenna port can include one or more antennas. The first antenna port can be considered a transmit and receive antenna port and the second antenna port can be considered receive-only except for selected other signal transmission antenna port. For example, some embodiments describe a receive-only antennas and antenna ports to describe how certain antenna ports that are mainly used for reception can transmit certain signals, like SRS, by sharing a power amplifier with a transmit and receive antenna or antenna port. The concept of "receive-only except for SRS" and the like is used only for convenience and these antenna ports are considered any antenna ports that share a same PA as, but receive less power than, another antenna port. Thus, the receive-only antenna ports can also be considered any antenna port for which the $\Delta T_{RxSRS}$ described above is applied. For example, such ports can receive less power from the PA due to electrical components between the PA and the receive-only antenna port being different from electric components between the PA and transmit/receive antenna port. The different electric components may be one or more than one of a longer trace from the PA to the receive-only antenna port, an additional at least one switch in the signal path, additional filters, different or additional matching circuits, and/or other elements that can incur additional power loss. Also, the PA may be physically further from the receive-only antenna than the transmit/receive antenna port, which can also cause different transmission power on the different antenna ports when using the same settings for the PA. Additionally, the term power relaxation in the present disclosure is based on allowing a UE to transmit at less maximum required power, such as relaxed power, on the receive-only antenna port than on the transmit/receive antenna port due to power loss between the PA and the receive-only antenna port. Embodiments can also be equally applicable to two or more transmit/receive antenna ports, or any other number of any type of antenna ports, when the antenna ports share a same PA and at least one of the antenna ports receives less transmit power than the other due to different power losses between the PA and the antenna ports. Earlier embodiments also describe transmit power allowed relaxation, which at least corresponds to a lower maximum transmit power allowed for an antenna port that shares a power amplifier with another antenna port.

According to a possible embodiment, transmitting SRS on the first antenna port can be switched when transmitting SRS on the second antenna port by using a switch. The switch can be coupled between the first antenna port and the power amplifier and coupled between the second antenna port and the power amplifier. The second antenna port can receive less power from the power amplifier when transmitting SRS than the first antenna port due to power loss between the power amplifier and the second antenna port. According to a possible embodiment, the first antenna port can be a transmit and receive antenna port. The second antenna port can be an antenna port that has an allowed transmit power reduction of its maximum output power for transmitting SRS.

At 220, the transmit power difference information can be transmitted. According to a possible embodiment, the transmit power difference information can be the transmit power difference between transmit power for SRS on the first antenna port and transmit power for SRS on the second antenna port. The transmit power difference can also be with respect to a transmit power difference for signals other than SRS. In most embodiments, the difference can be expressed in dB, which is 10 times the log of the ratio of the two powers. However, the difference can also be expressed as a ratio or expressed in other units, such as dBm, Watts, or other units.

According to a possible embodiment, reference symbols can be received. A first received power of the reference symbols can be measured on the first antenna port. A second received power of the reference symbols can be measured on the second antenna port. A received power difference can be determined by subtracting the second received power from the first received power. The determined transmit power difference information can be the determined received power difference. For example, the transmit power difference information can correspond to the transmit power difference, and the received power difference can be combined with received power difference measured by the gNB to determine the transmit power difference. Thus, the transmit power difference information can include information about the received power difference. According to a possible implementation, the measured received powers can be converted to dB before subtracting them.

According to a possible implementation of the above embodiment, the received power difference can be a first received power difference. A third received power of the reference symbols can be measured on a third antenna port. A second received power difference can be determined by subtracting the third received power from the first received power. The second received power difference can be transmitted. This can correspond to a case that the power amplifier is shared by more than two antenna ports, such as in the case of 1T4R described above.

According to another possible embodiment, reference symbols can be received. A first received power of the reference symbols can be measured on the first antenna port. A second received power of the reference symbols can be measured on the second antenna port. A received power ratio between the second received power from the first received power can be determined. The determined transmit power difference information comprises the determined received power ratio. A second received power ratio can also be determined similar to the second received power difference described above using a measured third received power.

Figure 3:
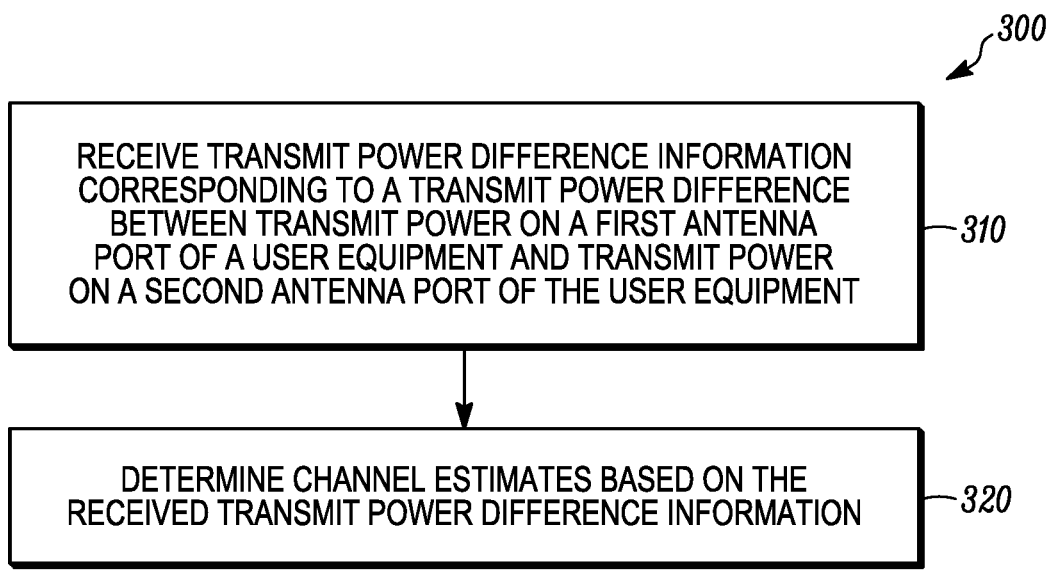
FIG. 3 is an example flowchart illustrating the operation of an apparatus according to a possible embodiment.

FIG. 3 is an example flowchart 300 illustrating the operation of a wireless communication device, such as the network entity 120, according to a possible embodiment. At 310, transmit power difference information can be received. The transmit power difference information can corresponding to a transmit power difference between transmit power on a first antenna port of a UE and transmit power on a second antenna port of the UE. At 320, channel estimates can be determined based on the received transmit power difference information.

According to a possible embodiment, receiving transmit power difference information can include receiving a UE transmit power relaxation of its maximum output power for SRS transmitted from the UE antenna port. Determining channel estimates can include forming channel estimates. Each channel estimate can be an estimate of a channel from the UE antenna port to each receive port of the network entity based on an SRS transmitted from the UE antenna port. The channel estimates can then be determined by scaling each of the formed channel estimates by the inverse of the transmit power relaxation for the UE antenna port.

According to a possible embodiment, precoding vectors can be determined based on the scaled channel estimates. The determined precoding vectors can be left singular vectors. The power allocation to these precoding vectors can be determined by the singular values determined from the scaled channel estimates.

According to a possible embodiment, reference symbols can be sent from an antenna port of the network entity. A signal can be sent instructing the UE to take measurements of received power using the sent reference symbols by taking a first measurement of received power on a first UE antenna port and by taking a second measurement of received power on a second UE antenna port that uses a same power amplifier for transmission as the first antenna port. A signal can be sent instructing the UE to determine and report a power difference resulting from subtracting the first measured received power on the second UE antenna port from the second measured received power on the first UE antenna port. The received transmit power difference information can be the determined power difference.

According to a possible implementation of the above embodiment, the determined power difference can be a UE power difference. SRS can be received from the UE. A first received power can be measured. The first received power can be the power from the SRS transmitted from the first UE antenna port and received on a first antenna network entity antenna port. A second received power can be measured using SRS transmitted from the second UE antenna port that uses the same PA as the first antenna port and received on the first network entity antenna port. A network entity received power difference can be computed by subtracting the power received from the second UE antenna port on the first network entity antenna port from the power received from the first UE antenna port on the first network entity antenna port.

According to a possible example of the above implementation, a transmit power relaxation can be determined for the second UE antenna port by subtracting the network entity received power difference from the UE power difference.

According to a possible implementation of the above example, a channel estimate can be formed from the second UE antenna port to each of antenna ports of the network entity based on the SRS transmitted by the second UE antenna port. The channel estimate can be scaled by an inverse of determined the transmit power relaxation for the second UE antenna port.

According to a possible example of the above implementation, precoders and power allocations can be computed for transmitting data to the UE based on the scaled channel estimates. Data can be transmitted to the UE based on the computed precoders and power allocations. The method for estimating the transmit power difference between two UE antenna ports sharing the same PA can be implemented using a network entity, such as an gNB, antenna port. The result can be the same independent of the gNB antenna port used to send the reference symbols to the UE and to measure the reference symbols received from the UE. Thus, this method for estimating the transmit power difference for two UE antenna ports can be done using multiple gNB antenna ports after which the results can be averaged. This can further improve the estimate of the transmit power difference at the UE.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments. Additionally, a network entity, such as a base station, transmission and reception point, mobility management entity, or other network entity, can perform reciprocal operations of a UE. For example, the network entity can transmit signals received by the UE and can receive signals transmitted by the UE. The network entity can also process and operate on sent and received signals.

Figure 4:
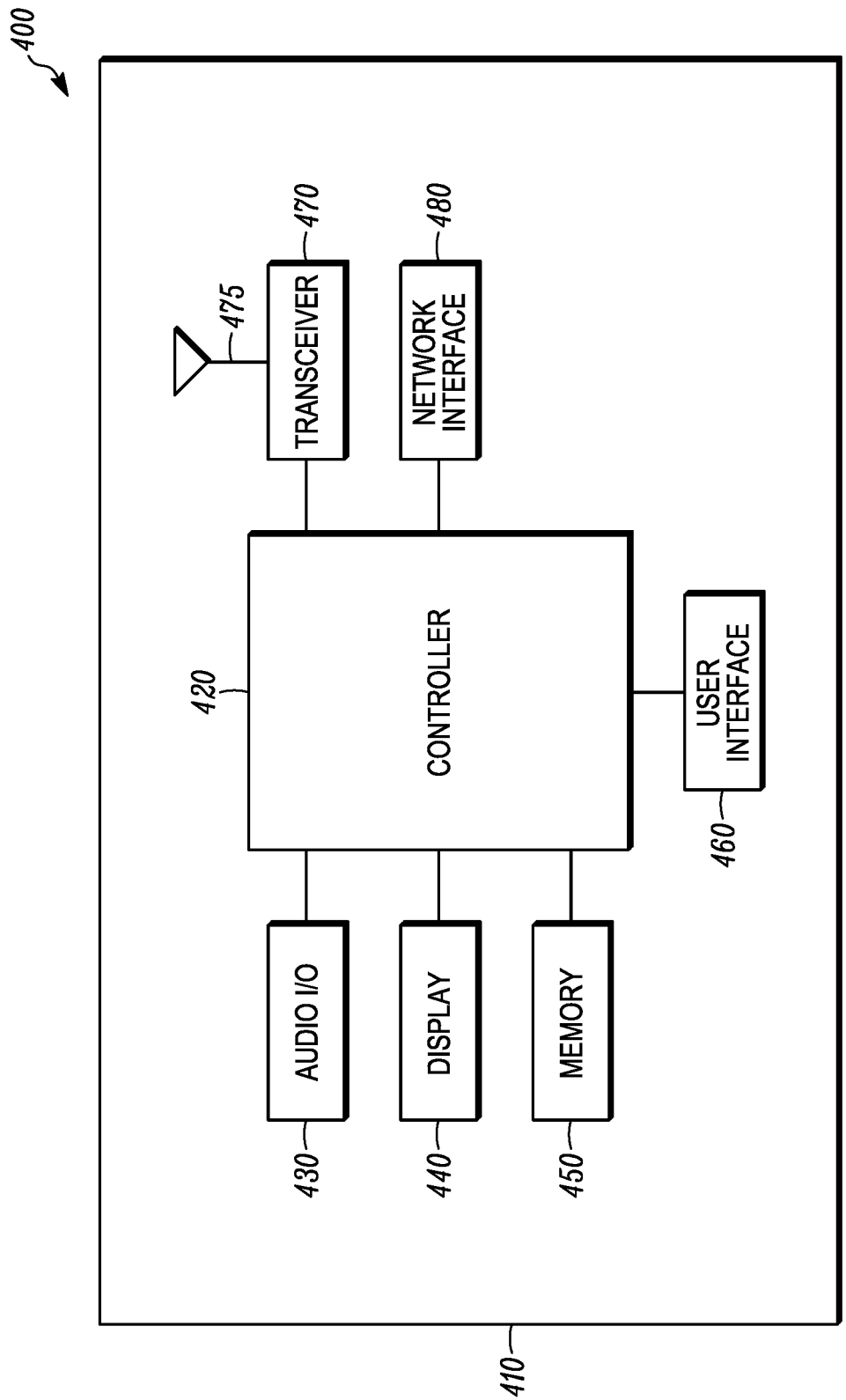
FIG. 4 is an example diagram of an apparatus according to a possible embodiment.

FIG. 4 is an example block diagram of an apparatus 400, such as the UE 110, the network entity 120, or any other wireless communication device disclosed herein, according to a possible embodiment. The apparatus 400 can include a housing 410, a controller 420 coupled to the housing 410, audio input and output circuitry 430 coupled to the controller 420, a display 440 coupled to the controller 420, a memory 450 coupled to the controller 420, a user interface 460 coupled to the controller 420, a transceiver 470 coupled to the controller 420, at least one antenna port 475, such as at least one antenna, coupled to the transceiver 470, and a network interface 480 coupled to the controller 420. The apparatus 400 may not necessarily include all of the illustrated elements for different embodiments of the present disclosure. The apparatus 400 can perform the methods described in all the embodiments.

The display 440 can be a viewfinder, an LCD, an LED display, an OLED display, a plasma display, a projection display, a touch screen, or any other device that displays information. The transceiver 470 can be one or more transceivers that can include a transmitter and/or a receiver. The audio input and output circuitry 430 can include a microphone, a speaker, a transducer, or any other audio input and output circuitry. The user interface 460 can include a keypad, a keyboard, buttons, a touch pad, a joystick, a touch screen display, another additional display, or any other device useful for providing an interface between a user and an electronic device. The network interface 480 can be a USB port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 450 can include a RAM, a ROM, an EPROM, an optical memory, a solid-state memory, a flash memory, a removable memory, a hard drive, a cache, or any other memory that can be coupled to an apparatus.

The apparatus 400 or the controller 420 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 450, elsewhere on the apparatus 400, in cloud storage, and/or anywhere else that can store software and/or an operating system. For example, coding for operations can be implemented as firmware programmed into ROM. The apparatus 400 or the controller 420 may also use hardware to implement disclosed operations. For example, the controller 420 may be any programmable processor. Furthermore, the controller 420 may perform some or all of the disclosed operations. For example, at least some operations can be performed using cloud computing and the controller 420 may perform other operations. At least some operations can also be performed computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 420 may be any controller or processor device or devices capable of operating an apparatus and implementing the disclosed embodiments. Some or all of the additional elements of the apparatus 400 can also perform some or all of the operations of the disclosed embodiments.

In operation, the apparatus 400 can perform the methods and operations of the disclosed embodiments. The transceiver 470 can transmit and receive signals, including data signals and control signals that can include respective data and control information. The controller 420 can generate and process the transmitted and received signals and information.

According to a possible embodiment based on the above description, a method at a UE can include determining the power relaxation applied for transmission on an antenna port which is a receive-only port except for the transmission of SRS symbols, and signaling the power relaxation for this UE antenna port to the gNB.

According to a possible related embodiment, a method at a gNB in which the gNB receives from the UE the transmit power relaxation for SRS transmitted from a UE antenna port that is receive-only except for the transmission of SRS can include forming an estimate of the channel from the UE receive-only transmit port to each gNB receive port based on the SRS transmitted from the receive-only port, and scaling these channel estimates by the inverse of the transmit power relaxation for the UE receive-only port.

According to a possible related embodiment, a method at a UE can include receiving reference symbols from a gNB antenna port, measuring a first power received from the gNB antenna port on a first UE antenna port that is used for both data transmission and reception, measuring the power received from the gNB antenna port on a second UE antenna port which is receive-only except for the transmission of SRS and which uses the same PA as the first antenna port, determining a received power difference for the gNB antenna port by subtracting the second received power from the first received power, and signaling the power difference for the gNB antenna port to the gNB.

According to a possible implementation of the above embodiment in which the UE receives reference symbols from a second gNB antenna port, the method can include measuring a first power received from the second gNB antenna port on a first UE antenna port that is used for both data transmission and reception, measuring the power received from the second gNB antenna port on a second UE antenna port which is receive-only except for the transmission of SRS and which uses the same PA as the first antenna port, determining a received power difference for the second gNB antenna port by subtracting the second received power from the first received power, and signaling the power difference for the second gNB antenna port to the gNB.

According to a possible related embodiment, a method at a gNB can include sending reference symbols from a gNB antenna port, signaling the UE to take measurements of the received power using these reference symbols where a first measurement is taken on a first UE antenna port that is used for both data transmission and reception and a second measurement is taken on a second UE antenna port that is receive-only except for the transmission of SRS and that uses the same PA as the first antenna port, and signaling the UE to report the power difference resulting from subtracting the power received on the second UE antenna port from the power received on the first UE antenna port.

According to a possible implementation of the above embodiment, the method can include receiving the received power difference reported by the UE.

According to a possible example of the above implementation, the method can include using SRS transmitted by the UE to measure the power received on a gNB antenna port, measuring a first received power from the SRS transmitted from a first UE antenna port that is used for both data transmission and reception, measuring a second received power using SRS transmitted from a second UE antenna port that is receive-only except for transmission of the SRS and that uses the same PA as the first antenna port, and computing a power difference by subtracting the power received from the second UE antenna port from the power received from the first UE antenna port.

Figure 5:
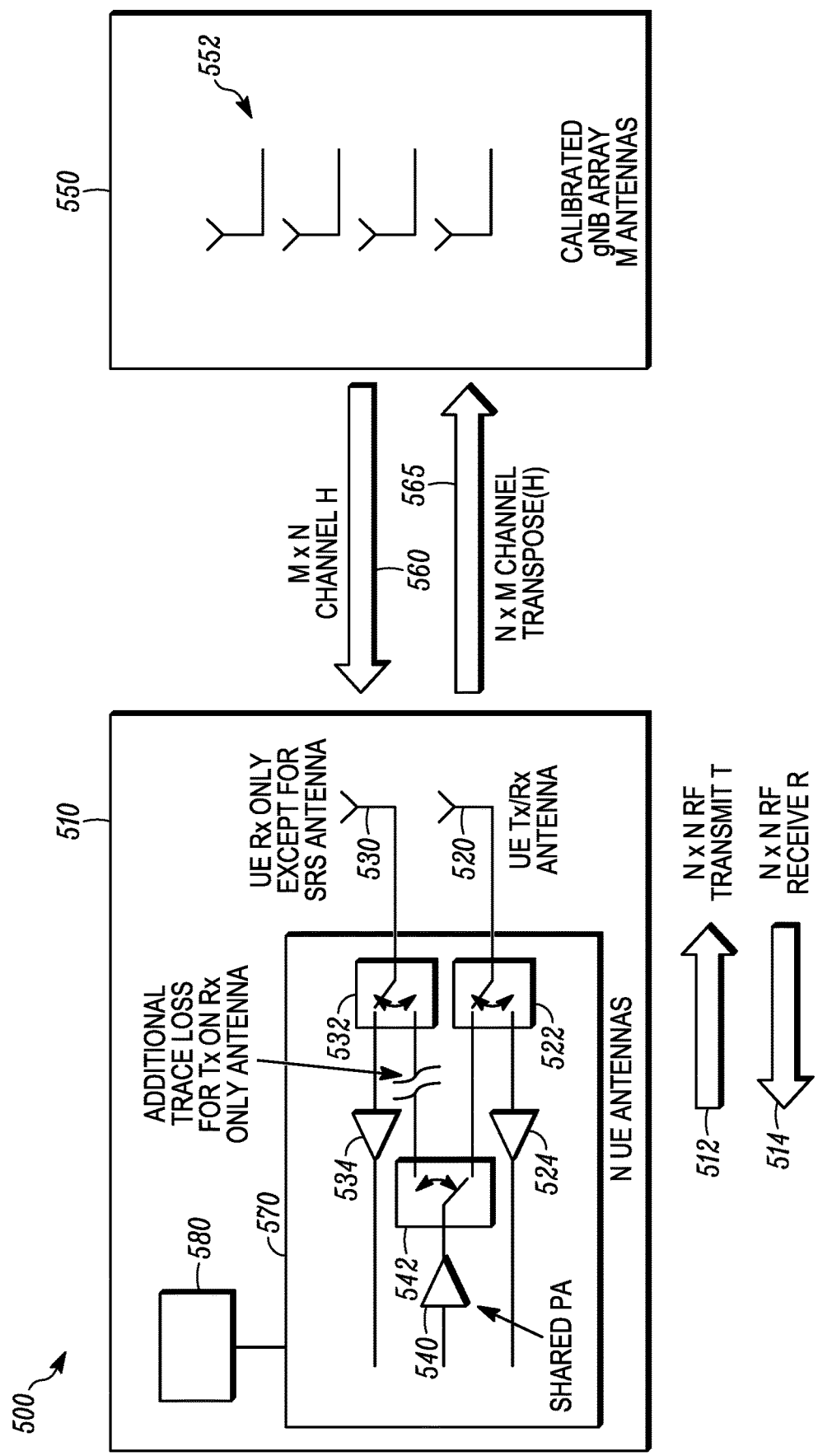
FIG. 5 is an example illustration of a system according to a possible embodiment.

FIG. 5 is an example diagram of a system 500 according to a possible embodiment. The system 500 can include wireless communication devices 510 and 550, such as the wireless communication device 400. The wireless communication device 510 can be a UE, such as the UE 110 and the wireless communication device 520 can be a network entity, such as the network entity 120. For simplicity, the device 510 only shows the controller 580, the transceiver 570, and the antenna ports 520 and 530 corresponding to the respective controller 420, transceiver 470, and antenna port 475 of the device 400 when the device 400 is a UE. The device 550 only shows the antenna ports 552 corresponding to the antenna port 475 of the device 400 when the device 400 is a network entity. Any described antenna port can be one or a plurality of antennas.

The device 510 can include N antennas including at least a first antenna 520 and a second antenna 530. The first antenna 520 can be a transmit and receive antenna and the second antenna 530 can be a receive-only antenna except for certain transmissions, such as SRS transmissions, where both antennas 520 and 530 can use the same transmit power amplifier 540 for transmission. The device 510 can include a transceiver 570, such as the transceiver 470, and a controller 590, such as the controller 420.

The first antenna 520 can be coupled to a switch 522 of the transceiver 570. The switch 522 can switch between coupling the first antenna 520 to receive circuitry including a first receive power amplifier 524 and coupling the first antenna 520 to transmit circuitry including the transmit power amplifier 540 and a switch 542 of the transceiver 570. The second antenna 530 can be coupled to a switch 532 of the transceiver 570. The switch 532 can switch between coupling the second antenna 530 to receive circuitry including a second receive power amplifier 534 and coupling the second antenna 530 to transmit circuitry including the transmit power amplifier 540 and the switch 542. The switch 542 can switch between which antenna 520 or 530 is coupled to the transmit power amplifier 540. The UE 510 can also include an N×N RF transmit channel T 512 and a N×N RF receive channel R 514.

The device 550 can include a calibrated gNB antenna array of M antennas 552. A downlink channel 560 between the device 550 and the device 510 can be a M×N channel H. An uplink channel 565 between the device 510 and the device 520 can be a N×M channel that is the transpose of the downlink channel H.

In operation according to a possible embodiment, the transceiver 570 can include a power amplifier 540. The first antenna port 520 can be coupled to the power amplifier 540 to receive power from the power amplifier 540. The second antenna port 530 can be coupled to the power amplifier 540 to receive power from the power amplifier 540. The controller 580 can be coupled to the transceiver 570. The controller 580 can determine transmit power difference information corresponding to a transmit power difference between transmit power on the first antenna port 520 and transmit power on the second antenna port 530. The transceiver 570 can transmit the transmit power difference information, such as via the antenna ports 520 and/or 530.

A switch 542 can be coupled between the first antenna port 520 and the power amplifier 540. The switch 542 can be coupled between the second antenna port 530 and the power amplifier 540. The controller 580 can control the switch 542 to switch between transmitting SRS on the first antenna port 520 and transmitting SRS on the second antenna port 530. The second antenna port 530 can receive less power from the power amplifier 540 when transmitting SRS than the first antenna port 520 due to power loss between the power amplifier 540 and the second antenna port 530.

According to a possible embodiment, the first antenna port 520 can be a transmit and receive antenna port. The second antenna port 530 can be an antenna port that has an allowed transmit power reduction of its maximum output power for transmitting SRS. This allowed transmit power reduction can account for power loss between the power amplifier 540 and the second antenna port 530. According to a possible embodiment, the transmit power difference information can be the transmit power difference between transmit power for SRS on the first antenna port 520 and transmit power for SRS on the second antenna port 530.

The transceiver 570 can receive reference symbols via the antenna ports 520 and 530. The controller 580 can measure a first received power of the reference symbols on the first antenna port 520. The controller 580 can measure a second received power of the reference symbols on the second antenna port 530. The controller 580 can determine a received power difference by subtracting the second received power from the first received power. The determined transmit power difference information can be the determined received power difference.

According to a possible embodiment, the received power difference can be a first received power difference. The controller 580 can measure a third received power of the reference symbols on a third antenna port (not shown). The controller 580 can determine a second received power difference by subtracting the third received power from the first received power. The transceiver 570 can transmit the second received power difference.

According to a possible embodiment, the transceiver 570 can receive reference symbols. The controller 580 can measure a first received power of the reference symbols on the first antenna port 520. The controller 580 can measure a second received power of the reference symbols on the second antenna port 530. The controller 580 can determine a received power ratio between the second received power from the first received power. The determined transmit power difference information can be the determined received power ratio.

To elaborate using equations for what is already described in the above embodiments, let $G_f$ denote the forward channel from the gNb (baseband) to the UE (baseband) which is given by $$G_f = HR,$$

and $G_r$ denote the transpose of the reverse channel from the UE (baseband) to the gNb (baseband) which is given by $$G_r = HT = HR \begin{bmatrix} \alpha_1^{-1} & 0 & 0 \\ 0 & \alpha_2^{-1} & 0 \\ 0 & 0 & \alpha_3^{-1} \end{bmatrix} = G_f \begin{bmatrix} \alpha_1^{-1} & 0 & 0 \\ 0 & \alpha_2^{-1} & 0 \\ 0 & 0 & \alpha_3^{-1} \end{bmatrix}.$$

Using SRS, the gNB measures $G_r = H\ T$. In order for the gNB to select the optimum precoder and code rate, it should compute $$G_f = G_r \begin{bmatrix} \alpha_1 & 0 & 0 \\ 0 & \alpha_2 & 0 \\ 0 & 0 & \alpha_3 \end{bmatrix}, \text{ where } \alpha_i = \frac{R_{i,i}}{T_{i,i}}.$$

In the absence of mutual coupling in the UE, the matrices T and R are diagonal matrices. The gNB observes the channel $G_r$ and needs to determine the channel $G_f$ in order to select the optimal precoder and power distribution, and thus needs a method for measuring the matrix $$\begin{bmatrix} \alpha_1 & 0 & 0 \\ 0 & \alpha_2 & 0 \\ 0 & 0 & \alpha_3 \end{bmatrix}.$$

The transmit power difference between any two UE antennas i and j and can be measured in the following manner. Let $G_{f\,k,i}$ denote the channel for a symbol transmitted from the k-th gNB antenna and received at the i-th UE transmit antenna. In order to enable the UE to measure the forward channel from the k-th gNb, a reference signal is transmitted from the k-th base station antenna and is received at the i-th UE antenna. The channel measured at the UE is given by $G_f = u_k^T H\ R$, where $u_k = [0, \ldots, 0, 1, 0, \ldots, 0]^T$ is a length-M vector having a single "1" in the i-th position. If there is no mutual coupling in the UE receiver, then the signal received at the output of the RF for the i-th UE antenna is given by $H_{k,i} R_{i,i}$, and similarly, the signal received at the output of the j-th UE antenna is given by $H_{k,j} R_{j,j}$ In order to enable the gNB to measure the reverse channel $G_r$, from the i-th UE antenna (including the UE RF), the UE transmits a reference symbol from the i-th UE antenna. The channel measured at the gNB is given by $G_r = HT\ v_i$, where $v_i = [0, \ldots, 0, 1, 0, \ldots, 0]^T$ is a length-N vector having a single "1" in the i-th position. If there is no mutual coupling in the UE transmitter, then the signal received at the output of the k-th gNB antenna is given by $H_{k,i} T_{i,i}$. Similarly, when a reference symbol is transmitted from the j-th UE antenna, the signal received at the output of the k-th gNB antenna is given by $H_{k,j} T_{j,j}$.

Based on the measurements, the UE reports the amplitude of the ratio $$\left| \frac{H_{k,i} R_{i,i}}{H_{k,j} R_{j,j}} \right|$$

or equivalently, this ratio in dB given by $$\Delta_{R\,k,i,j} = 10\log10 \left| \frac{H_{k,i} R_{i,i}}{H_{k,j} R_{j,j}} \right| = 10\log10 |H_{k,i} R_{i,i}| - 10\log10 |H_{k,j} R_{j,j}|.$$

The ratio, or equivalently the dB difference, can be signaled from the UE to the gNB. Similarly, based on the gNB measurements of the reference symbols transmitted UE antenna ports i and j and measured at the gNB antenna port k, the gNB can compute the ratio $$\left| \frac{H_{k,i} T_{i,i}}{H_{k,j} T_{j,j}} \right|$$

or equivalently, this ratio in dB given by $$\Delta_{T\,k,i,j} = 10\log10 \left| \frac{H_{k,i} T_{i,i}}{H_{k,j} T_{j,j}} \right| = 10\log10 |H_{k,i} T_{i,i}| - 10\log10 |H_{k,j} T_{j,j}|.$$

With knowledge of both $\Delta_{R\ k,i,j}$ and $\Delta_{T\ k,i,j}$, the gNB computes the difference $$\Delta_{Rk,i,j} - \Delta_{Tk,i,j} = 10\log 10|H_{k,i}R_{i,i}| -$$
$$10\log 10|H_{k,j}R_{j,j}| - (10\log 10|H_{k,i}T_{i,i}| - 10\log 10|H_{k,j}T_{j,j}|) =$$
$$10\log 10|R_{i,i}| - 10\log 10|R_{j,j}| - 10\log 10|T_{i,i}| + 10\log 10|T_{j,j}| = |\alpha_i| - |\alpha_j|$$

As noted above in the discussion, the difference $|\alpha_i|-|\alpha_j|$ is independent of the antenna port k of the gNB and thus any gNB antenna port can be used to transmit the reference symbols measured by the UE so long as the same antenna port is used to measure the reference symbols transmitted by the UE.

Let the UE antenna ports i and j share the same power amplifier where antenna port i is for both transmit and receive and antenna port j is receive only except for SRS. If the gNB has knowledge of $|\alpha_i|$, then $|\alpha_j|$ can be computed as $$|\alpha_i|-(\Delta_{R\ k,i,j}-\Delta_{T\ k,i,j})=|\alpha_i|-(|\alpha_i|-|\alpha_j|)=|\alpha_j|.$$

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is not admitted as prior art, is written as the inventor's own understanding of the context of some embodiments at the time of filing, and includes the inventor's own recognition of any problems with existing technologies and/or problems experienced in the inventor's own work.

LIST OF ABBREVIATIONS

3GPP 3rd Generation Partnership Project
5G Fifth Generation
ACK Acknowledgement
A-CSI Aperiodic CSI
BWP Bandwidth Part
CC Component Carrier
CCCH SDU Common Control Channel Service Data Unit
CCE Control Channel Element
CDMA Code Division Multiple Access
CRC Cyclic Redundancy Check
CRI CSI-RS Resource Index
C-RNTI Cell RNTI
CSI-RS Channel State Information Reference Signal
CSI Channel State Information
CSS Common Search Space
DCI Downlink Control Information
DL Downlink
DMRS Demodulation Reference Signal
eNB Enhanced NodeB
gNB New Radio NodeB
HARQ-ACK Hybrid Automatic Repeat Request-Acknowledgement
HST High Speed Train
IoT Internet of Things
LTE Long Term Evolution
MAC CE Medium Access Control Control Element
MCG Master Cell Group
MCS Modulation and Coding Scheme
MPE Maximum Permissible Exposure
NACK Non-Acknowledgement
NUL Non-supplementary Uplink
NR New Radio
OFDMA Orthogonal Frequency Division Multiple Access
PA Power Amplifier
PCell Primary Cell
PDCCH Physical Downlink Control Channel
PDSCH Physical Downlink Shared Channel
PDU Protocol Data Unit
PHR Power Headroom Report
P-MPR Power Management Maximum Power Reduction
PRACH Physical Random Access Channel
PUCCH Physical Uplink Control Channel
PUSCH Physical Uplink Shared Channel
FDD Frequency Division Duplex
QCL Quasi-co-location
RAR Random Access Response
RLF Radio Link Failure
RNTI Radio Network Temporary Identifier
RRM Radio Resource Management
RS Reference Signal
RSRP Reference Signal Received Power
SAR Specific Absorption Rate
SCell Secondary Cell
SCG Secondary Cell Group
SFI Slot Format Indicator SFN Single Frequency Network
SpCell Special Cell (i.e. a PCell of a MCG or SCG)
SS/PBCH Synchronization Signal/Physical Broadcast Channel
SSBRI SS/PBCH Block Resource Index
SR Scheduling Request
SP-CSI Semi-persistent CSI
SPS Semi-persistent scheduling
SRS Sounding Reference Signal
SRI SRS Resource Indicator
SUL Supplementary Uplink
TB Transport block
TCI Transmission Configuration Indicator
TC-RNTI Temporary Cell RNTI
TDD Time Division Duplex
TDMA Time Division Multiple Access
UCI Uplink Control Information
UE User Equipment
UL Uplink
URLLC Ultra-Reliable Low-Latency Communication
TRP Transmission and Reception Point
USS UE-specific Search Space

I claim:

1. A user equipment (UE) for wireless communication, comprising:
at least one memory; and
at least one processor coupled with the at least one memory and configured to cause the UE to:
receive reference symbols;
measure a first received power of the reference symbols on a first antenna port;
measure a second received power of the reference symbols on a second antenna port that is coupled to and uses a same transmit power amplifier as the first antenna port;
determine a received power difference based on a relationship between the second received power and the first received power; and
transmit a value of the received power difference, wherein a transmit power relaxation for the second antenna port relative to the first antenna port is based on a relationship between the received power difference and a base station received power difference.

2. The UE of claim 1, wherein the relationship between the second received power and the first received power comprises:
a subtraction of the second received power from the first received power, or
a ratio between the second received power and the first received power.

3. The UE of claim 1,
wherein the received power difference comprises a first received power difference, and
wherein the at least one processor is configured to cause the UE to:
measure a third received power of the reference symbols on a third antenna port that is coupled to and uses the same transmit power amplifier as the first antenna port;
determine a second received power difference based on a relationship between the third received power and the first received power; and
transmit a value of the second received power difference.

4. The UE of claim 3, wherein the at least one processor is configured to cause the UE to measure a received power of the reference symbols, determine a power difference, and transmit a value of the power difference for all antenna ports that are coupled to and use the same transmit power amplifier as the first antenna port.

5. The UE of claim 1, wherein the reference symbols comprise at least one selected from channel state information reference symbols (CSI-RS) and demodulation reference symbols (DMRS).

6. A processor for wireless communication, comprising:
at least one controller coupled with at least one memory and configured to cause the processor to:
receive reference symbols;
measure a first received power of the reference symbols on a first antenna port;
measure a second received power of the reference symbols on a second antenna port that is coupled to and uses a same transmit power amplifier as the first antenna port;
determine a received power difference based on a relationship between the second received power and the first received power; and
transmit a value of the received power difference, wherein a transmit power relaxation for the second antenna port relative to the first antenna port is based on a relationship between the received power difference and a base station received power difference.

7. The processor of claim 6, wherein the relationship between the second received power and the first received power comprises:
a subtraction of the second received power from the first received power, or
a ratio between the second received power and the first received power.

8. A method performed by a user equipment (UE), the method comprising:
receiving reference symbols;
measuring a first received power of the reference symbols on a first antenna port;
measuring a second received power of the reference symbols on a second antenna port that is coupled to and uses a same transmit power amplifier as the first antenna port;
determining a received power difference based on a relationship between the second received power and the first received power; and
transmitting a value of the received power difference, wherein a transmit power relaxation for the second antenna port relative to the first antenna port is based on a relationship between the received power difference and a base station received power difference.

9. The method of claim 8, wherein the relationship between the second received power and the first received power comprises:
a subtraction of the second received power from the first received power, or
a ratio between the second received power and the first received power.

10. The method of claim 8,
wherein the received power difference comprises a first received power difference, and
wherein the method further comprises:
measuring a third received power of the reference symbols on a third antenna port that is coupled to and uses the same transmit power amplifier as the first antenna port;
determining a second received power difference based on a relationship between the third received power and the first received power; and transmitting a value of the second received power difference.

11. The method of claim 10, further comprising measuring a received power of the reference symbols, determining a power difference, and transmitting a value of the power difference for all antenna ports that are coupled to and use the same transmit power amplifier as the first antenna port.

12. A base station for wireless communication, comprising:
at least one memory; and
at least one processor coupled with the at least one memory and configured to cause the base station to:
send reference symbols from a base station antenna port;
send a signal to take measurements of received power using the sent reference symbols by taking a first measurement of received power on a first antenna port and by taking a second measurement of received power on a second antenna port that uses a same power amplifier for transmission as the first antenna port;
send a signal to determine and report a power difference resulting from a relationship between the first measured received power on the second antenna port and the second measured received power on the first antenna port;
compute a base station received power difference by subtracting the power received from the second antenna port on the base station antenna port from the power received from the first antenna port on the base station antenna port; and
determine a transmit power relaxation for the second antenna port relative to the first antenna port based on a relationship between the base station received power difference and the determined power difference.

13. The base station of claim 12, wherein the relationship between the first measured received power on the second antenna port and the second measured received power on the first antenna port comprises:
a subtraction of the second received power from the first received power, or
a ratio between the second received power and the first received power.

14. The base station of claim 12, wherein the at least one processor is configured to cause the base station to receive power difference information including the determined power difference.

15. The base station of claim 14,
wherein the determined power difference comprises a user equipment UE power difference, and
wherein the at least one processor is configured to cause the base station to:
receive sounding reference symbols (SRS);
measure a first received power from the SRS transmitted from the first antenna port and received on a base station antenna port;
measure a second received power using SRS transmitted from the second antenna port that uses the same power amplifier as the first antenna port and is received on the base station antenna port; and
compute the base station received power difference by subtracting the power received from the second antenna port on the base station antenna port from the power received from the first antenna port on the base station antenna port.

16. The base station of claim 15, wherein the at least one processor is configured to cause the base station to:
form a channel estimate from the second antenna port to each of base station antenna ports of the base station based on the SRS transmitted by the second antenna port; and
scale the channel estimate by an inverse of the determined transmit power relaxation.

17. The base station of claim 16, wherein scaling the channel estimate by the inverse of the determined transmit power relaxation comprises:
adding the power relaxation to the channel estimate, or
multiplying the channel estimate by a ratio of the first transmit power to the second transmit power.

18. The base station of claim 16,
wherein the first antenna port comprises a first user equipment (UE) antenna port and the second antenna port comprises a second UE antenna port, and
wherein the at least one processor is configured to cause the base station to receive SRS, measure received power, compute the base station received power difference, determine the transmit power relaxation for each UE antenna port relative to the first UE antenna port, form the channel estimate, and scale the channel estimate for each antenna UE port that uses the same power amplifier as the first UE antenna port.

19. The base station of claim 16, wherein the at least one processor is configured to cause the base station to:
compute precoders and power allocations for transmitting data based on the scaled channel estimates; and
transmit data based on the computed precoders and the power allocations.

* * * * *